US006996932B2

(12) United States Patent
Kruer et al.

(10) Patent No.: US 6,996,932 B2
(45) Date of Patent: *Feb. 14, 2006

(54) UNITIZED MAT TO FACILITATE GROWING PLANTS

(76) Inventors: Thomas R. Kruer, 543 Garden View, Edgewood, KY (US) 41017; Hugh A. Thompson, 5777 Windermere La., Fairfield, OH (US) 45014

( * ) Notice: Subject to any disclaimer, the term of this patent is extended or adjusted under 35 U.S.C. 154(b) by 0 days.

This patent is subject to a terminal disclaimer.

(21) Appl. No.: 10/439,416

(22) Filed: May 16, 2003

(65) Prior Publication Data

US 2003/0213171 A1    Nov. 20, 2003

Related U.S. Application Data

(60) Provisional application No. 60/449,325, filed on Feb. 24, 2003, provisional application No. 60/381,070, filed on May 17, 2002.

(51) Int. Cl.
*A01G 29/00* (2006.01)
*B05B 1/14* (2006.01)
*B05B 15/00* (2006.01)

(52) U.S. Cl. .................. 47/48.5; 47/21.1; 47/62 E; 47/9; 239/542; 239/450; 239/553.3; 239/145; 239/553.5

(58) Field of Classification Search ............... 47/62 E, 47/9, 48.5, 79, 32, 21.1, 32.1, 1.01 F, 1.01 T; 239/542, 450, 553.3, 145, 553.5
See application file for complete search history.

(56) References Cited

U.S. PATENT DOCUMENTS

| | | | | |
|---|---|---|---|---|
| 3,205,619 A | * | 9/1965 | Henry | 47/9 |
| 3,302,323 A | * | 2/1967 | Popa | 47/9 |
| 3,774,850 A | | 11/1973 | Zeman | |
| 3,939,875 A | * | 2/1976 | Osborn et al. | 138/178 |
| 4,047,995 A | * | 9/1977 | Leal-Diaz | 156/203 |
| 4,060,200 A | * | 11/1977 | Mehoudar | 239/542 |
| 4,065,926 A | * | 1/1978 | Brandt | 405/36 |
| 4,095,618 A | | 6/1978 | Spencer | |
| 4,126,998 A | | 11/1978 | Gilead | |
| 4,130,245 A | | 12/1978 | Bryson | |
| 4,199,106 A | | 4/1980 | Kojimoto et al. | |
| 4,285,472 A | * | 8/1981 | Okada et al. | 239/542 |
| 4,336,666 A | * | 6/1982 | Caso | 47/48.5 |
| 4,473,191 A | * | 9/1984 | Chapin | 239/542 |
| 4,534,515 A | * | 8/1985 | Chapin | 239/542 |
| 4,831,776 A | * | 5/1989 | Fritch | 47/33 |

(Continued)

FOREIGN PATENT DOCUMENTS

DE   4408556 A1 * 9/1994

(Continued)

*Primary Examiner*—Peter M. Poon
*Assistant Examiner*—Andrea M. Valenti
(74) *Attorney, Agent, or Firm*—Egbert Law Offices

(57) ABSTRACT

A unitized mat to facilitate growing plants includes at least two polymeric material layers defining fluid-conveying passageways forming distribution headers and a flow restrictor, an inlet for delivery of a fluid into the distribution headers, and an outlet for dispensing fluid into a root zone area covered by at least one layer of the polymeric material layers. The polymeric layers are sized and shaped to cover an area immediately around at least one plant. The flow restrictor, for metering the fluid, is in fluid connection with the distribution header and a multi-dimensional array of outlets. The present invention combines a fluid distribution device and artificial mulching. The method of manufacturing and using the unitized mat to enhance the growth of plants is also disclosed.

28 Claims, 8 Drawing Sheets

U.S. PATENT DOCUMENTS

| | | | |
|---|---|---|---|
| 4,833,822 A | | 5/1989 | DiGrassi |
| 5,058,317 A | * | 10/1991 | McMurtrey ................. 47/31.1 |
| 5,117,580 A | * | 6/1992 | Brown ............................. 47/9 |
| 5,118,042 A | * | 6/1992 | Delmer ....................... 239/542 |
| 5,301,633 A | | 4/1994 | Lloyd |
| 5,520,339 A | * | 5/1996 | Kuo ........................... 239/542 |
| 5,695,127 A | * | 12/1997 | Delmer et al. ............... 239/542 |
| 5,729,929 A | * | 3/1998 | Burke ............................. 47/9 |
| 5,749,109 A | | 5/1998 | Kappel |
| 5,785,785 A | * | 7/1998 | Delmer et al. ............... 156/203 |
| 5,829,686 A | * | 11/1998 | Cohen ..................... 239/533.1 |
| 5,839,659 A | | 11/1998 | Murray |
| 6,293,477 B1 | | 9/2001 | Chambers |
| 6,367,782 B1 | * | 4/2002 | Guetersloh ................. 261/106 |
| 6,460,786 B1 | * | 10/2002 | Roberts ....................... 239/542 |
| 2002/0113147 A1 | * | 8/2002 | Huntley ..................... 239/542 |

FOREIGN PATENT DOCUMENTS

| | | | |
|---|---|---|---|
| EP | 0293857 | * | 6/1988 |
| JP | 54134784 A | * | 10/1979 |

* cited by examiner

SCALE:~10X

SCALE:~20X

SCALE:~20X

US 6,996,932 B2

UNITIZED MAT TO FACILITATE GROWING PLANTS

RELATED U.S. APPLICATIONS

The present utility patent application is based upon Provisional Patent Application Ser. No. 60/381,070 filed on May 17, 2002 and entitled "FLUID DISTRIBUTION PRODUCT", presently pending.

The present utility patent application is based upon Provisional Patent Application Ser. No. 60/449,325 filed on Feb. 24, 2003 and entitled "FLUID DISTRIBUTION PRODUCT FOR WOODY PLANTS", presently pending.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to a unitized mat to facilitate growing plants. More specifically, this invention relates to a system of fluid distribution for achieving very efficient drip irrigation rates. Also, the invention relates to combining water distribution with a plastic mulch to realize the benefits of both in one inexpensive and versatile assembly. The present invention relates to optimizing growing conditions of plants through an inexpensive, durable, and easy to install device.

BACKGROUND OF THE INVENTION

There are a variety of different types of systems currently available for distributing water for the irrigation of cultivated plants. Likewise, plastic mulch of various types and materials are currently being produced for the landscaping, turf, horticulture, and food production markets.

Drip Irrigation

Of the various forms of irrigation systems, drip or micro-drip irrigation is considered to be the most desirable because they have been shown to save water, reduce the use of horticultural chemicals, are relatively insensitive to environmental effects, reduce labor, and promote superior plant growth as compared to other technologies.

Most importantly, drip irrigation is an effective irrigation system in terms of water conservation. With drip systems, water is not wasted by watering areas between rows or from run-off. Furthermore, the problems of excessive evaporation, wind-effects, and overspray are avoided by putting the water directly onto the ground rather than simulating rainfall.

It is noted that other systems, such as wick irrigation and hydroponics, are currently being used but are generally considered cost prohibitive in all applications outside of commercial greenhouses and are not considered pertinent here.

All drip irrigation systems share several things in common. They all generally consist of a central water supply transport means, usually a hose or pipe, and numerous water emission device(s). These emission devices are typically called emitters and are designed to dissipate the irrigation water as evenly as possible at low flow rates, i.e. drips. In addition, drip systems all require relatively fine mesh filtration to avoid clogging of the emitters. Finally, some level of pressure regulation is required as most drip irrigation systems operate at pressures between 8 psi and 15 psi. Drip irrigation systems can be categorized as either line source or point source dissipation systems.

Line source dissipation systems emit the water uniformly along the full length of the main supply hose. A series of small holes or similar means are positioned along the length and serve to dissipate the pressure and thus the water flow down to a drip. Line source systems are often referred to as soaker hose or drip tape.

In the past, various U.S. patents have issued in the field of line source systems. U.S. Pat. No. 3,205,619, issued on Sep. 14, 1965 to J. W. Henry, discloses an irrigation mulching sheet consisting of an integral irrigating means permitting more economical use of available water while improving ease of installation and stability of the structure. Water is continuously provided along the linear tubing of the sheet.

U.S. Pat. No. 3,774,850, issued on Nov. 27, 1973 to David G. Zeman, discloses a polymeric, preferably biodegradable tube for agricultural use for distributing water to plants located along the length of the tube. The tube includes a plurality of outlet openings so as to restrict the flow of water to each of the outlets. The tube may also have mulch sections along the length of the tube. Preferably the walls of the tube are thin enough to be broken up by normal agricultural instruments such as plows. The tube has limited durability.

U.S. Pat. No. 4,095,618, issued on Jun. 20, 1978 to Lloyd Spencer, describes an irrigation rodent deterrent tube, particularly adapted for drip or trickle irrigation. The tube has a flat configuration when free of internal pressure. The tube also has laterally projecting webs which tend to be the first to be bitten by a rodent while exploring the presence of the irrigation tube. The webs may be enlarged to contain a concentration of a deterrent or toxic material.

U.S. Pat. No. 4,199,106, issued on Apr. 22, 1980 to Takatsuiki Susumu Kojimoto et al., discloses an irrigation hose which is produced by melt-sticking double thermoplastic resin film in a plane along longitudinal parallel lines so as to form a supply passage with communicating holes and constant pressure passages with water-irrigating holes. The invention includes aligning the communicating holes and/or water-irrigating holes to provide irrigating water along the hose.

U.S. Pat. No. 4,473,191, issued in September 1984 to Chapin, discloses a drip tape fabricated from thin plastic material. The drip tape incorporates a series of tortuous paths to accomplish the desired pressure drop and flow reduction. The pre-installed or pre-molded dissemination devices, such as emitters, are positioned along the length of the tape.

U.S. Pat. No. 5,839,659, issued on Nov. 24, 1998 to Eric S. A. Murray, discloses a capillary system that provides water, nutrient solutions and gases such as air to the root zone of plants. The system uses one or more conduits having perforations spaced apart therealong, with the conduits being held in pockets. In use, the capillary system is buried to an appropriate depth in soil below the plants to be irrigated. The upper layer of capillary cloth is wet by the flow out of the perforations and serves to distribute water.

Soaker hose devices are another line source irrigation system, often made of particulate matter, such as ground-up vehicle tires, that have been compressed with binder into a semi-solid hose-type material. Alternatively, the soaker hose consists of a flat hose which has been punched with holes after manufacture. Both of these types of soaker hose are relatively expensive and some have been known to disintegrate over a short period of time, thus reception by professional and agricultural consumers has not been good.

Drip tape devices, as disclosed in the prior art, are fabricated from thin plastic material and incorporates a series of tortuous paths to accomplish the desired pressure drop and flow reduction. The pre-installed or pre-molded dissemination devices (emitters or emitter discharge points) are spaced along the length of the device at fixed distances ranging from six inches to 48 inches.

Prior art drip tape is generally inexpensive to manufacture due to the relatively small amount of plastic material being used. Due to the use of low cost materials and thin wall thickness, drip tape is typically designed to last only one or two growing seasons prior to being removed and replaced.

Drip tape lines are often buried a few inches below the surface of the ground to be planted in order to minimize the evaporation of the water from the surface. However, if installed below the surface, these products depend on the capillary action of the soil to override the force of gravity. Therefore, the entire planting bed typically needs to be wetted to fully irrigate the root zones of the plants. As discussed later, plastic agricultural mulch is normally installed over the top of the drip tape to further minimize evaporation and to control weeds.

When drip tape systems have been used for the irrigation of uniformly and closely spaced plants (commercial applications) they have had good reception. They have been quite effective as an irrigation technique and as a water conservation vehicle when compared to overhead spray and furrow systems. Because drip tape distributes water evenly over the entire length of a planting bed, some water is wasted or used by weeds between the plants. Thus there is a need to distribute water precisely to the plants being watered and not the space between while being easy to install.

In applications where plants, in any given plot, can vary in size, spacing, and species, a system having fixed spacing between disseminators such as drip tape may not be preferred due to wasted water. Point Source systems are designed for these "random planting" applications.

The most popular point source drip irrigation systems employ emitters installed in the water transport lines as needed, such that the water is disseminated at specific points where the emitters are placed. An advantage of a point source dissemination system is that the irrigation can be "customized" for any plant spacing or size. That is, plants of different sizes and water requirements can be accommodated in the same watering zone by varying the number of emitters and/or their flow rates.

When plants are spaced 2.5 feet apart or greater, experience has shown that point source drip irrigation is the most effective system for saving water. In fact, the further the plants are spaced apart, the more cost-effective point source drip irrigation becomes, on a relative basis, when compared with overhead spray or furrow irrigation systems. When used in landscaping applications, the main tube and emitter lines can be covered with mulch or bark chips and look quite attractive. Of course, after the plant material has matured, these installations look even more attractive.

Another advantage of a point source drip irrigation system is that it can be installed after the plants are in place. Installation is usually quite easy but extremely time consuming. Thus the major disadvantage of these systems is the labor and material expenses associated with the custom installation. The emitters are also prone to clogging with contaminants in the water due to their small passages so expensive filters and/or constant maintenance is required.

Attempts are being made to modify drip irrigation systems to deliver less water per emitter so that the irrigated plants receive the optimum amount of water over a longer period of the day. These "Ultra Low Drip Irrigation" systems are very complex to operate and clogging represents the major obstacle to achieving the objective of optimum plant growing conditions.

Prior art point source irrigations systems include U.S. Pat. No. 4,126,998, issued on Nov. 28, 1978 to Gideon Gilead, which teaches an irrigation apparatus comprising first and second layers of sheet material. The layers are bonded together at surfaces to define a liquid conduit, having at least one pressure reducing path associated therewith and an exit port from each of the at least one pressure reducing paths. The apparatus is linear and is installed underground.

Thus there is a need for an inexpensive drip irrigation system which does not waste irrigation water between plant sites. There is also a need for a drip irrigation system which is easy to install and remove when no longer needed. Furthermore, there is a need for a drip irrigation system that is able to deliver very small amounts of water at specific plant sites without being prone to clogging.

Mulch

There are various forms of mulch used in the home landscaping industry with additional types produced for commercial agriculture applications. The benefits of mulching include; less water evaporation, less weeds, soil warming and heat retention leading to earlier and higher yields, erosion control, and a more uniform appearance. Types of mulch include organic, plastic film, and irrigating mats.

Organic mulch, such as hardwood bark and pine needles, tend to be the most aesthetically pleasing but quickly degrade in the environment or wash away with heavy rains.

Plastic Film mulch (agricultural film or geotextiles) are effective weed barriers and are preferred in most commercial applications where they can be placed prior to planting. They are very effective at soil erosion abatement and weed control while minimizing surface water evaporation. The perforated or woven versions which are air and water permeable are most desirable but also the most expensive.

Artificial mulch has been disclosed in prior patents, including U.S. Pat. No. 4,833,822, issued on May 30, 1989 to Paul DiGrassi, describing a mulch strip of an elongated base sheet formed from a flexible plastic material having a pair of parallel fluid reservoir tubes extending along the length of each base strip, down the opposite side edges of the strip. Each of the fluid reservoir tubes is provided with a hose fitting for connection with a conventional garden hose for filling the reservoir tubes with water. In use, the water filled tubes serve to hold the mulch strip in place and form a channel for retaining rain water on the surface of the strip. The fluid reservoir tubes also collect heat and serve to keep the ground beneath the strip warm after sunset. A plurality of concentric perforations are spaced along the length of the base sheet for the insertion of plants into the ground through the base sheet.

In commercial farming, thin agricultural film is typically placed over planting beds after drip tape has been installed. This combination has proven to be very effective at producing high yields of quality product with relatively low water use.

Irrigating mats are a recent development in the field of artificial mulch, which employ a layer of water distributing material bonded to the underside of a plastic sheet in order to distribute water over the entire area covered by the mat. The prior art includes U.S. Pat. No. 5,301,633, issued on Apr. 12, 1994 to Thomas G. Lloyd, that teaches a flat and thin bladder device used to cause earthworms to migrate to the earth's surface for easy collection. The bladder is laid flat on the earth's surface and soaks the ground underneath the bladder perforations. Soaking the earth under the bladder causes earthworms to migrate to the surface and they are then easily collected as the bladder is lifted to expose them.

U.S. Pat. No. 6,293,477, issued on Sep. 25, 2001 to Robert J. Chambers, describes an irrigator configured from a flexible or semi-flexible material which can conform to various sizes and shapes of terrain. According to various embodiments of the irrigator, seep holes may be provided. The irrigator contains holes for various plant life to take root through and for facilitating drainage. The irrigator may have multiple, distinct passages for the collection and/or distribution of multiple fluids or gases.

Other related mat devices are taught in U.S. Pat. No. 4,130,245, issued on Dec. 19, 1978 to John D. Bryson and U.S. Pat. No. 5,749,109, issued on May 12, 1998 to Thomas F. Kappel. The Bryson patent teaches a generally flat envelope or package for controllably dispensing into the atmosphere a liquid substance which is normally liquid and vaporizable under atmospheric temperature and pressure conditions. The Kappel patent relates to blankets for use with forced air convection systems, wherein the blankets includes means to provide air through selective areas of the lower sheet of the blanket. These devices relate to using a mat to disburse a fluid throughout the mat, although the application to irrigation and selective plant growth is not addressed.

The failings of prior art irrigation mats include wasting irrigation water between plant sites because the ground becomes soaked without consideration of the location of the plant or root zone of the plant. There is also a need for an irrigation mat which is easy to install and remove when no longer needed. Furthermore, there is a need for an irrigation mat that is able to deliver very small amounts of water at specific plant sites without being prone to clogging. The prior art irrigation mats use materials that are expensive and serve only to redistribute water that is already in the soil rather than actually providing irrigation to the specific plant sites.

Thus, there is a need to combine the water saving benefits of Ultra Low drip Irrigation systems with the many benefits of plastic mulch into an inexpensive, durable, and easy to install product.

BRIEF SUMMARY OF THE INVENTION

The present invention is a unitized mat to facilitate growing plants comprising at least two polymeric material layers defining fluid-conveying passageways forming distribution headers and a flow restricting means, an inlet means for delivery of a fluid into the distribution headers, and an outlet means for dispensing and metering fluid into a root zone area covered by at least one layer of the polymeric material layers. The polymeric layers are sized and shaped to cover an area immediately around at least one plant. The flow restricting means is in fluid connection with the distribution header and a multi-dimensional array of outlet means.

The fluid conveying passageways are comprised of formed recesses within one or more surfaces of the polymeric material layers. The passageways, as distribution headers and flow restricting means disburse irrigation fluid throughout the polymeric material layers. The distribution header has an integral filter at an end thereof, wherein the integral filter comprises a plurality of sediment traps. The passageways provide a metered fluid discharge to each of the outlet means. They are designed to distribute equal amounts of irrigation water to each of multiple outlet means and evenly over a portion of the covered area. The irrigation water is dispensed at a rate approaching that at which the plant is using the water.

The polymeric material layers act as an artificial mulch with properties selected to enhance plant growth. The layers form a generally impervious barrier to gas, fluid, light, and undesired plants. The polymeric material layers have a selected shape, color, or multiple colors, which can be exposed by inverting the mat. Additionally, the polymeric material layers have reflective and absorptive properties to enhance plant growth. Design with any of these pre-selected properties allows the unitized mat to suppress weed propagation, deter insects, reduce water evaporation and control temperature, in order to optimize the growing conditions of the plant.

The polymeric material layers are comprised of a material selected from a group consisting of thermoplastics, polyethylene, polypropylene, polyester, nylon, thermoplastic elastomers; and thermosets and a chemical stabilizer to improve durability. At least one of the polymeric material layers is of bicomponent construction with a single surface having a lower-melt temperature layer.

The polymeric material layers have a perforation in which the plant extends therethrough and the outlet means are located in proximity to said perforation for the plant. There can also be multiple outlet means and perforations positioned at pre-determined planting sites. An outlet means can comprise a plurality of outlets located around a single perforation for the plant. The outlet means and the perforations are selectively openable.

The polymeric material layers can also have aeration perforations formed therethrough within the area immediately around the plant and located in areas wherein the aeration perforations do not intersect or interfere with the function of the fluid conveying passageways.

The unitized mat may also include additional elements. For example, the unitized mat can have a mulch placed on top of the polymeric material layers. The mulch is affixed to one of the polymeric material layers and may be artificial. The mulch can be made of scrap or recycled polymeric material, including polymeric material left from construction of the mat. Also, seeds can be placed in proximity to the outlet means as a way of pre-seeding and planting the seeds. Furthermore, the unitized mat may include an additional polymeric material layer selectively bonded to the polymeric material layers to form at least one region of air. The air pocket can insulate and affect temperature.

For the flow restricting means with a length equal to or greater than one foot, fluid flow can be metered. As the outlet means directs fluid to discrete plant sites, fluid throughout said outlet means is supplied with an inlet pressure of 10 pounds per square inch, and fluid flows to each outlet means at approximately 0.10 gallons per hour or less. For other lengths and other cross-sections, at an inlet pressure of 10 pounds per square inch, fluid flows to each outlet means at approximately 0.010 gallons per hour or less. These long flow restricting means have expanded cross section, which are large enough to be resistant to clogging by contaminants in the irrigation fluid.

The present invention also discloses the manufacture of a unitized mat to facilitate the growth of plants, comprising the steps of: extruding a first polymeric material layer; laminating a second polymeric layer to the first polymeric material layer; and selectively bonding the first and second polymeric material layers so as to create fluid conveying passageways between the first and second polymeric material layers defined by bonded and non-bonded areas. The fluid conveying passageways can also be created by vacuum forming into the first polymeric material layer. Selective bonding the polymeric material layers can comprises laser bonding the polymeric material layers together or using adhesives. For some methods of manufacture, a pressurized fluid is introduced within the non bonded areas to inflate and open the fluid conveying passageways prior to use.

The present invention further describes a method of enhancing the growth of plants comprising: forming a unitized mat having at least one polymeric material layer, the polymeric material layer having a selected color, reflective properties, barrier properties, and shape to act as an effective artificial mulch, and delivering water through a fluid passageway in the unitized mat through irrigation watering outlets at one or more selected rates and locations. Perforations can be formed which result in an opening large enough for a plant and spaced at optimum distances to enhance plant growth. The method to facilitate growing plants including the fluid-conveying passageways as distribution headers and flow restrictors for delivering a fluid from an inlet to the outlet and metering this fluid from the distribution headers is also disclosed. The present invention further describes adapting a unitized mat to act as an artificial mulch, and delivering and flow restricting irrigation fluid through the unitized mat to a multi-dimensional array of outlet means.

The above and other objects, features and other advantages of the present invention will be more clearly understood from the following detailed description taken in conjunction with the accompanying drawings.

DETAILED DESCRIPTION OF THE INVENTION

Figure 1:
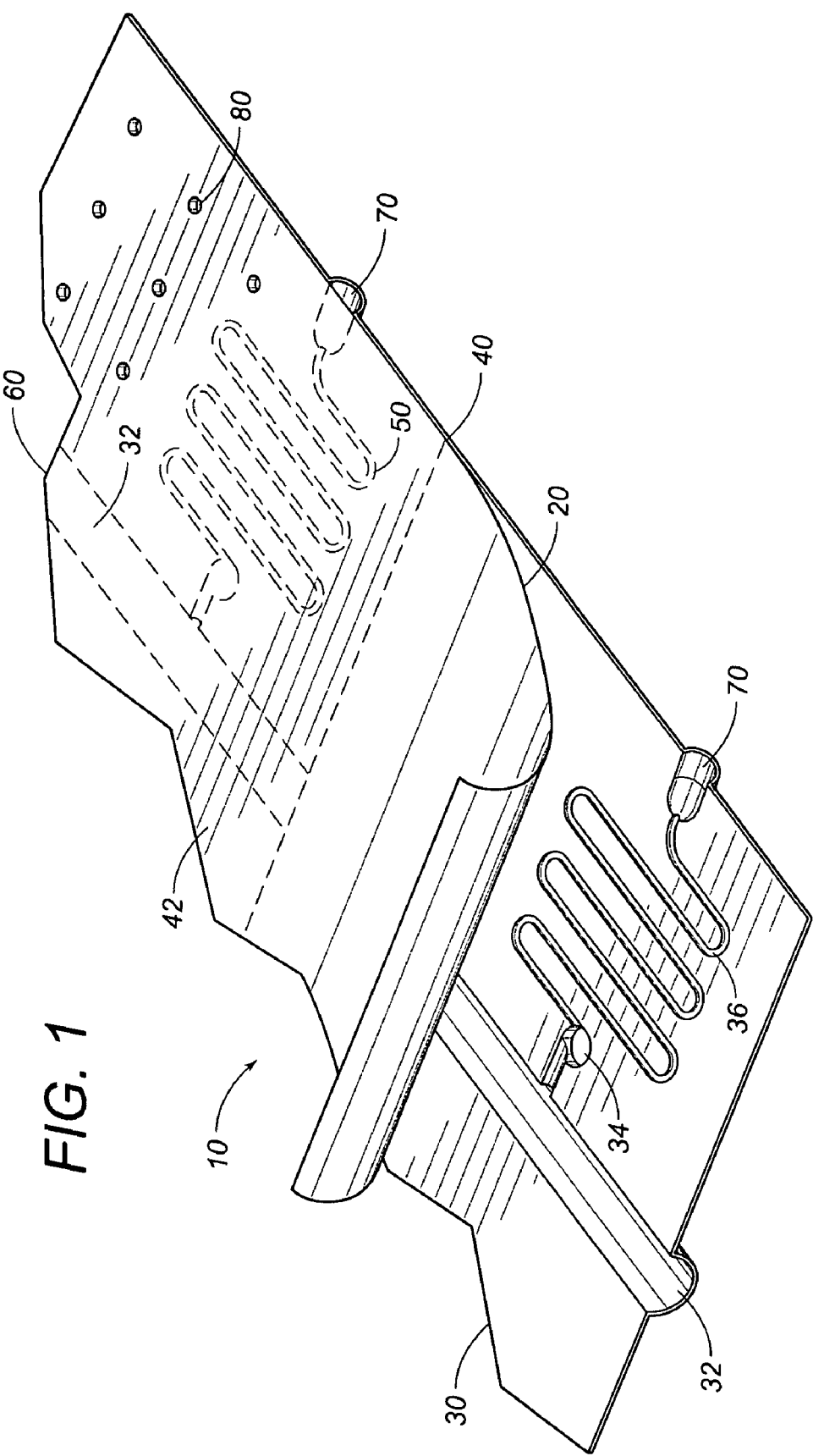
FIG. 1 is a partially exploded perspective view of the basic construction of the present invention.

While the present invention is capable of embodiment in various forms, there is shown in the drawings and will hereinafter be described, a series of presently preferred embodiments with the understanding that the present disclosure is to be considered as an exemplification of the invention, and is not intended to limit the invention to the specific embodiments illustrated.

Referring now to the drawings, and more particularly to FIG. 1, a unitized mat, generally indicated at 10, comprises multiple layers 20 & 30 of fluid-retaining polymeric material having length and width both many times its thickness. The top layer 20 of thin polymeric material is laminated and selectively bonded to the bottom layer 30 of similar thin polymeric material to form a fluid tight seal 40 in all areas other than those which remain non-bonded to define at least one fluid-conveying passageway 50. Bonding the polymeric material layers 20 & 30 can be accomplished with heat, pressure, adhesive, or a combination thereof.

The fluid-conveying passageway 50 may be divided into distribution headers 32, debris traps 34, flow restricting means 36, and outlet ports 70. These details may be mechanically embossed or molded into the surface of the bottom or top polymeric material layer 20 or 30 prior to the layers being bonded together. The well known "cast-on-drum" vacuum-forming method, in which the layer(s) is vacuum formed immediately after extrusion, before cooling, is well suited to the formation of the fluid-conveying passageway 50. Impinging static air pressure and pressure forming methods are additional methods known in the art for forming these elements.

The polymeric material layers 20 & 30 have fluid retaining properties and include thermoplastics such as polyethylene, polypropylene, polyester, nylon, polyvinylchloride, thermoplastic elastomers, or the like, and may contain chemical stabilizers for improved durability. Material selection for the polymeric material layers 20 & 30 is based upon low cost, physical strength, the ability to form fluid-conveying passageway 50, and the ability to bond with fluid tight seals. The facing surfaces may be treated or have a second lower melt temperature component to compliment high strength, durable thermal bonds therebetween. The polymeric material layers 20 & 30 may contain a portion of recycled plastics.

The resulting laminated assembly 42 has an inlet 60 and at least one outlet port 70 in fluid communication with the fluid-conveying passageway 50 and within the multi dimensional area of the polymeric material layers 20 & 30.

Perforations 80 can also be added through one or all of the polymeric material layers 20 & 30 of the laminated assembly 42 to allow passage of fluids and gases or to allow planting. These perforations 80 are located in areas that do not interfere with the function of the fluid-conveying passageways 50. Subsequent to bonding, the film may be further heated and subjected to high vacuum to perforate the layers. Alternatively, these perforations 80 may be made mechanically.

Figure 2:
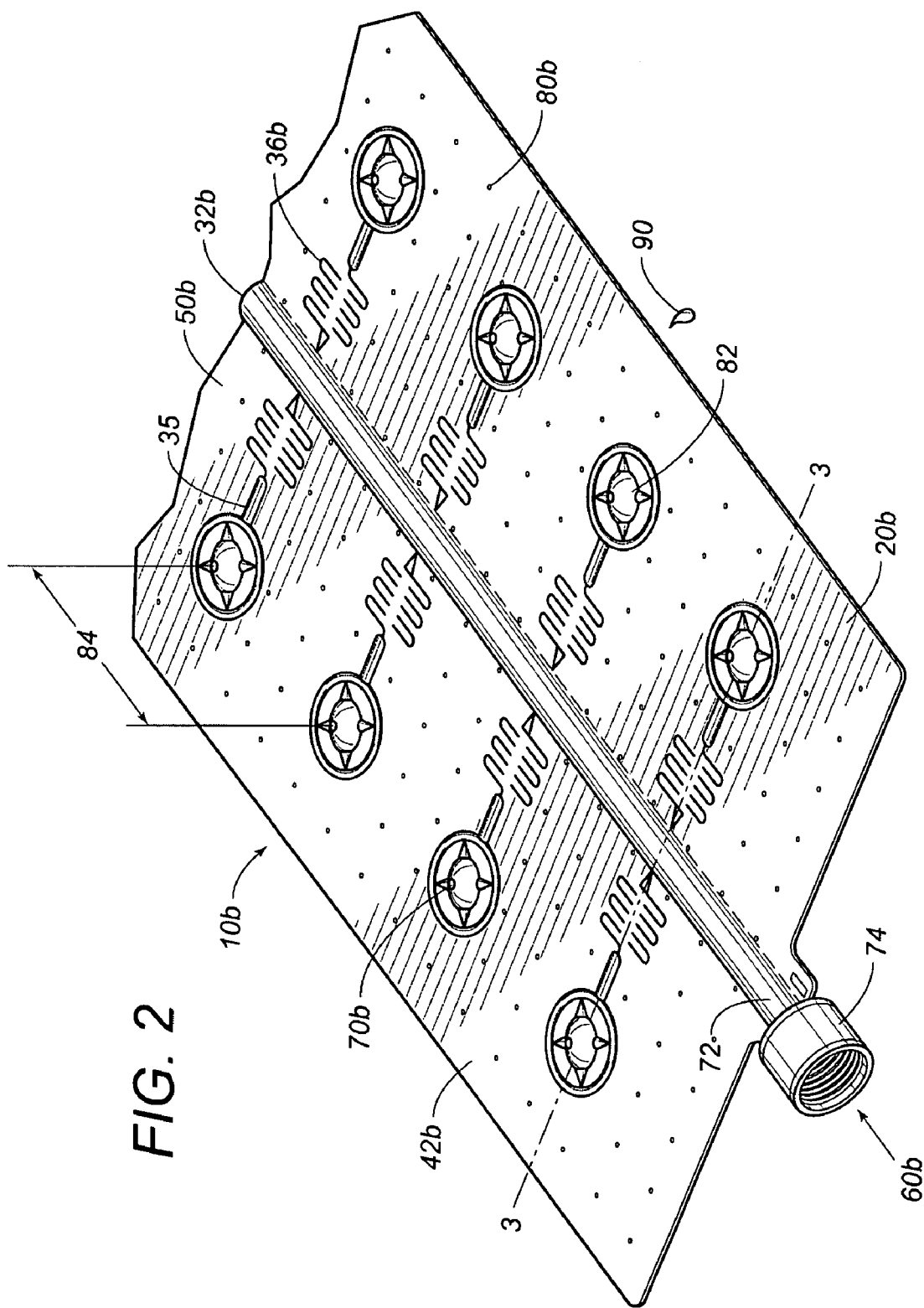
FIG. 2 is an upper perspective, isometric view of one embodiment of the present invention designed for equally spaced plants in multiple rows.

FIG. 2 depicts a generalized, isometric view of one embodiment of the current invention, generally indicated at 10b, designed for growing plants spaced at consistent distances, such as found in commercially grown vegetable crops. It can be seen how the laminated assembly 42b of polymeric material, having a distribution header 32b, a repeated pattern of flow restricting means 36b of long length and multiple outlet ports 70b can be configured into a unitized mat which facilitates the growing of plants. The distribution header 32b is terminated 72 with a fitting 74 thus allowing for attachment of the inlet 60b to a fluid source (not shown).

It will be noted that the laminated assembly 42b is made wide enough and shaped to act as artificial agricultural mulch. The layers 20b & 30b (not shown, as it is covered by top layer 20b) may be any color, such as white, black, red, brown, green, or other colors for desired appearance or providing the plants optimum growing conditions. For example, using black or other absorptive polymeric material for the top layer 20b will result in additional absorbed and retained solar heat in the growing bed to stimulate early seed germination while white or other reflective material would reflect some of the summer heat. Constructing the unitized mat 10b with layers of different colors would allow for inverting the device to present a different color on the upper surface and thus further improve growing conditions.

The wide laminated assembly 42b is perforated through with individual planting sites 82 which are spaced at a distance 84 for optimum plant growth. Flow restricting means 36b extend out to near the base of the plant and terminate in secondary distribution headers 35. Due to the additional area provided by the wider assembly, the flow restricting means 36b can be of sufficient length to assure uniform and extremely low flow rates. A series of outlet ports 70b, designed to minimize the chance for clogging when in contact with wet growing medium, are positioned around the secondary distribution headers 35. Smaller perforations 80b allow rainwater to pass through and allow some aeration of the soil.

The unitized mat 10b provides for the disbursing of irrigation fluid 90 from the inlet 60b, thru the network of fluid-conveying passageways 50b, to the consistently and optimally spaced planting sites 82 in an area covered by the laminated assembly 42d. Irrigation fluid 90 can be delivered at approximating the rate at which the plant uses it employing flow restricting means 36b which are not prone to plugging.

Two or more smaller parallel distribution headers may be used rather than one large one in order to reduce the hoop stress in the thin polymeric material layers 20b & 30b which form the distribution headers 32d thus allowing the polymeric material to be thinner.

Figure 3:
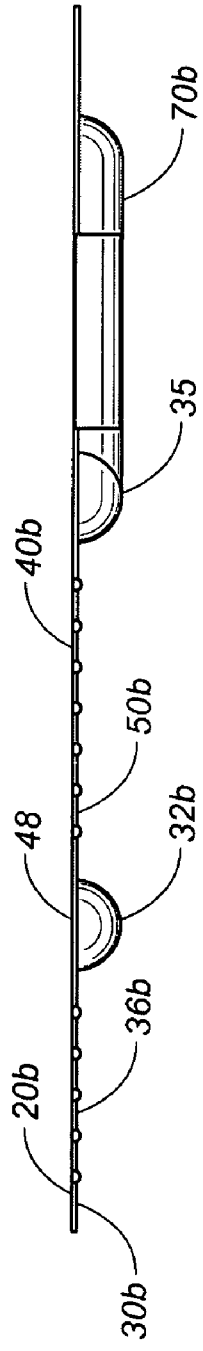
FIG. 3 is a cross sectional view of the embodiment depicted in FIG. 2.
Figure 4:
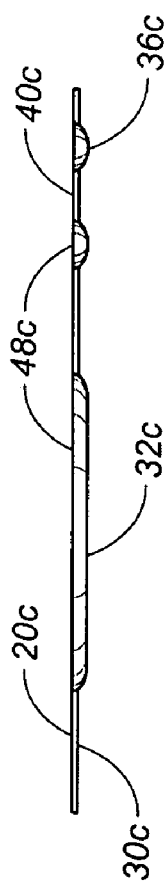
FIG. 4 is a cross sectional view of the embodiment depicted in FIG. 2 employing an alternative construction.
Figure 5:
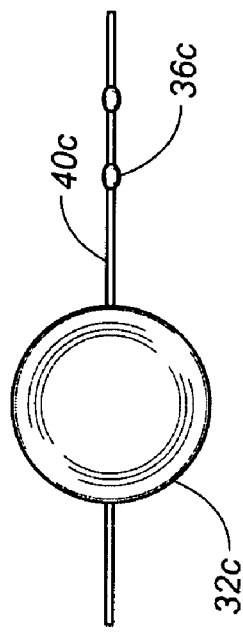
FIG. 5 is a cross sectional view of the alternative construction depicted in FIG. 4 when subjected to pressure.

FIGS. 3, 4, & 5 are magnified cross sectional views across line 3—3 of the basic embodiment of the current invention as shown in FIG. 2. FIG. 3 depicts the top layer 20b bonded to the bottom layer 30b having a formed distribution header 32b, flow restricting means 36b and secondary headers 35. It can be seen that the distribution header 32b and the secondary distribution headers 35 have cross sections much larger than the flow restricting means 36b. These particular construction elements are shown with semicircular cross section but any cross sectional profile could also be used.

The top layer 20b is selectively bonded to the bottom layer 30b so as to create fluid tight seals 40b and to create the fluid-conveying passageways 50b where there are non bonded areas 48.

FIGS. 4 and 5 depicts a magnified cross sectional view of an alternate construction for the unitized mat depicted in FIG. 2. It can be seen that the distribution header 32c and flow restricting means 36c are not formed with a semicircular cross section but are created by selectively bonding the top layer 20c to the bottom layer 30c. The non bonded areas 48c thus form the fluid-conveying passageways 50c for transmitting fluid. The bonding can be accomplished with a combination of pressure and heat from any source, including lasers, or use of adhesives.

When the alternative construction depicted in FIG. 4 is pressurized it generally takes on the cross sectional profile shown in FIG. 5. The fluid received through the inlet 60b flows through the non bonded areas 48 which open under pressure to create the distribution header 32c and flow restricting means 36c to be expelled at the outlets 70b. After the polymeric layers 20c and 30c are bonded using this alternate construction high pressure fluid may be introduced into the flow restricting means 36c to open them prior to use.

Figure 6:
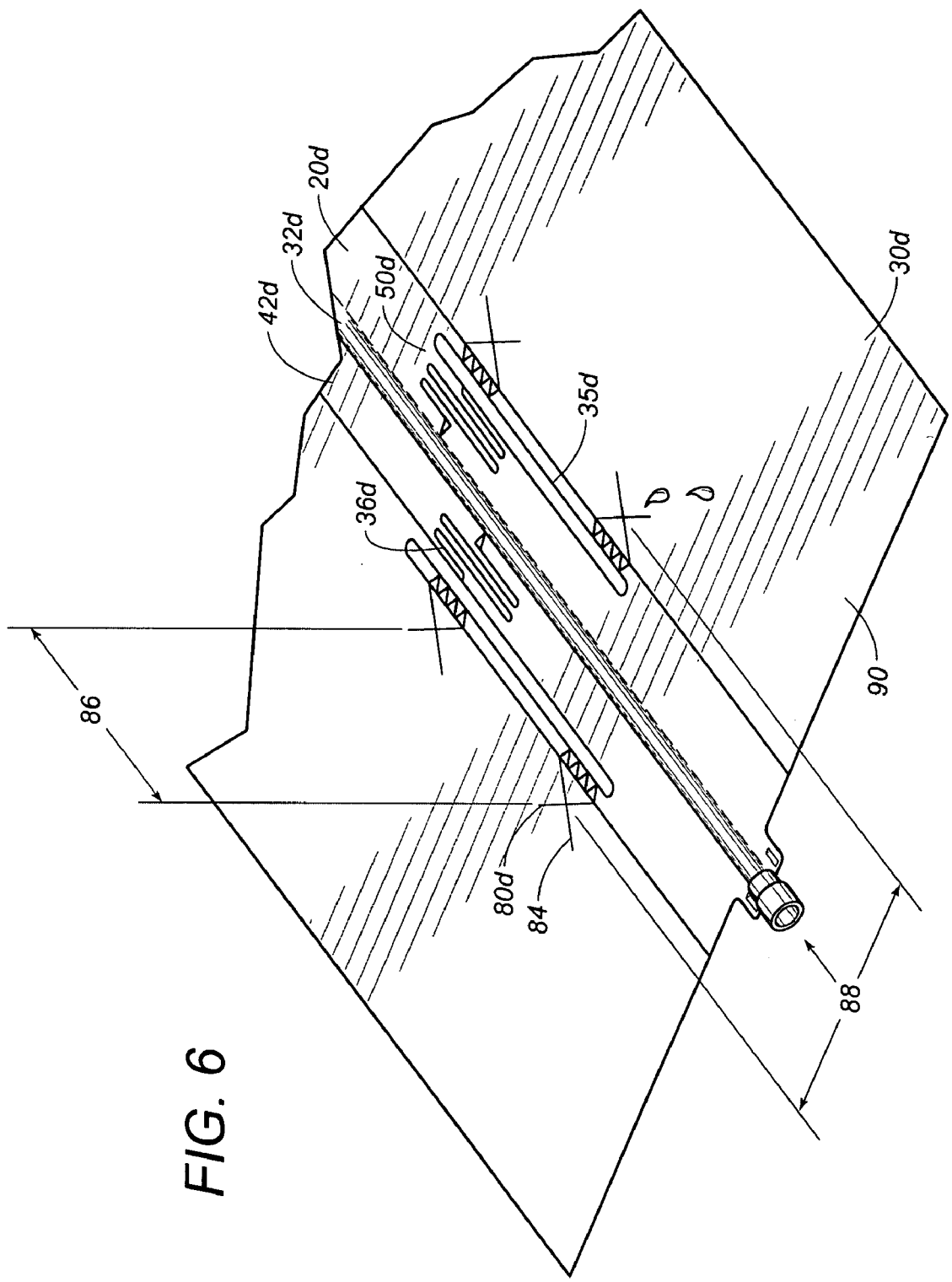
FIG. 6 is an upper perspective, isometric view of a second embodiment of the current invention designed for a commercial crop.

FIG. 6 depicts another preferred embodiment of the current invention specifically designed to grow plants spaced at consistent distances in multiple rows, such as found in commercially grown crops. Unlike the embodiment shown in FIG. 2, only the bottom layer 30d of the laminated assembly 42d is made wide to act as agricultural mulch. The top layer of polymeric material 20d is wide enough to allow the fluid-conveying passageways 50d to extend out from the centrally located distribution header 32d to multiple outlet ports 70d located near the planting sites 80d.

The flow restricting means 36d are of sufficient flow length, as defined by the linear distance traced by the centerline of the conduit, to assure uniform and low delivery rates to secondary distribution headers 35d. The secondary distribution headers 35d supplies irrigation fluid 90 to the outlet ports 70d. As depicted, two groups of outlet ports 70d are supplied by each secondary distribution header 35d. Thus, the embodiment shown in FIG. 6 is generally capable of delivering one half of the fluid to each planting site 80d as that of the embodiment shown in FIG. 2 employing identical flow restricting means 36b & 36d.

The multiple outlet ports 70d are configured to provide sufficient additional flow restriction to equalize the flow through the secondary distribution header 35d and dispense fluid at a consistent rate to all outlet ports 70d.

"X" shaped perforations 84 are made through the wider bottom layer 30d and spaced at plant-to-plant spacing 86 and row-to-row spacing 88 determined by research to be ideal to enhance plant growth. Plants or seeds (not shown) are planted through the perforations 84 after the mat 10e is installed over the planting bed. The plants are thus spaced for optimum growth without the need for measuring or additional fixtures. It will be understood that the unitized mat will be oriented so that the outlet ports 70d will be toward the soil.

Both the wide bottom layer 30d and the narrower top layer 20d may be any color(s) so that the mulch offers the plants optimum growing conditions. For example, the wide bottom layer 20d may be black to retain heat early in the growing season while the narrower top layer 30d may be red to stimulate fruit production. Alternatively, the top layer 20d may have a top reflective surface to ward off insects.

Figure 7:
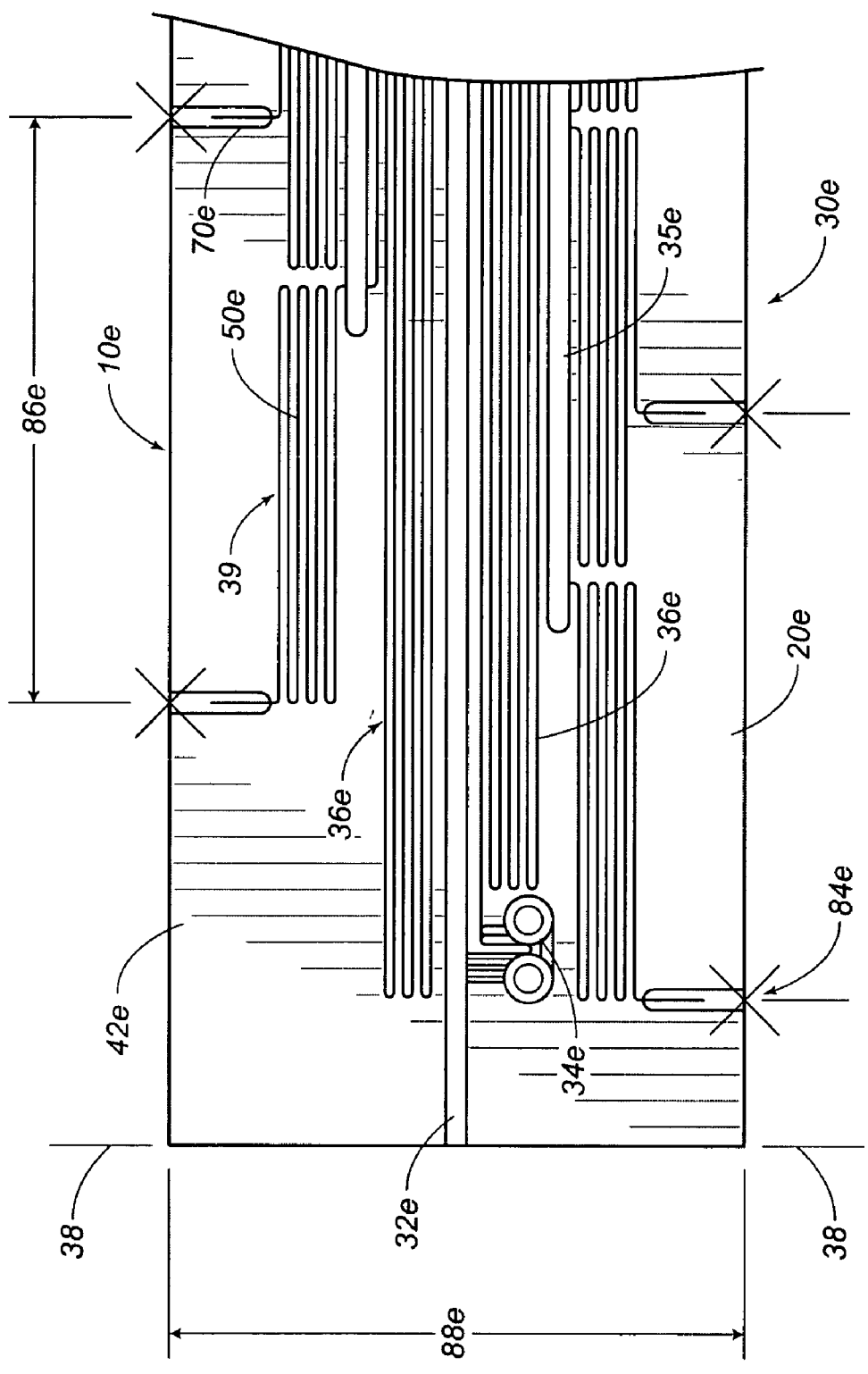
FIG. 7 is a top plan view of the second embodiment depicted in FIG. 6 showing specific design features.

FIG. 7 depicts a detailed plan view of a specific application of the second embodiment shown in FIG. 6. This device, generally indicated at 10e, is particularly designed to enhance the growth of strawberry plants planted in rows.

In keeping with the latest horticulture research, the wide bottom layer 30e would act as an agricultural mulch and be made of black, low density polyethylene material approximately 52 inches wide to cover the entire growing bed. The bottom layer of polymeric material 30e, acting as a mulch, would retain solar heat within the bed early in the growing season, inhibit weed growth, and minimize surface evaporation. In addition, the black material may be used to heat the irrigating fluid as it passes through the fluid-conveying passageways 50e resulting in additional soil warming capabilities.

Similarly, the narrower top layer 20e would be approximately 12 inches wide and be made of white, low density polyethylene material to reflect additional sunlight up into the plant to encourage canopy growth and early fruit production. Both layers of polymeric material 20e and 30e would be approximately 0.004 inches thick and bonded together with heat. The outer extensions 38 of the bottom layer 30*e*, which are located outside the area experiencing internal fluid pressure may be made significantly thinner, such as 0.001 inches.

A debris trap 34*e* is formed at the beginning of the smaller flow restricting means 36*e* so that contaminants in the fluid stream are trapped prior to reaching them. The debris trap 34*e* may use filtration and/or sedimentation principles to eliminate any fluid borne contaminants.

A first flow restricting means 36*e* feeds one secondary distribution header 35*e*. The secondary distribution header 35*e* supplies irrigation fluid 90 (not shown) to four outlet ports 70*e* through a set of secondary flow restricting means 39. The first set of flow restricting means 36*e* has a flow path length greater than one foot (as disclosed below) so as to achieve significant flow reduction while being large in cross section to avoid plugging.

"X" shaped perforations 84*e* are made in the laminated assembly 42*e* on 12 inch centers 86*e* and aligned in two rows having 12 inch center spacing 88*e*. This spacing has been determined to be the optimum configuration and distance for strawberry plant growth. These "X" shaped perforations 84*e* are only partially cut through so that upon initial installation the material is retained in the plane of the wide bottom layer 30*e*. Greenhouse grown strawberry transplants can be planted by pushing through the perforations 84*e* after the mat 10*e* is installed on the beds.

The described network of fluid-conveying passageways 50*e* is configured to consistently provide irrigation fluid at approximately 0.01 gallons per hour to each of the outlet ports 70*e*. This rate has been determined to be optimal for strawberry production based upon continuous irrigating during eighteen hours per day in the desired growing conditions. A distribution header 32*e* having a diameter of 0.375 inches is capable of delivering this 0.01 gallons of fluid per hour per outlet with a variation of less than 8 percent along a bed having a length of 330 feet. Similar illustrative dimensions for the flow restricting means 36*e*, having a semicircular cross section, are given as: 0.040 inches wide by 0.020 inches deep and 25 feet long flow length.

Figure 8:
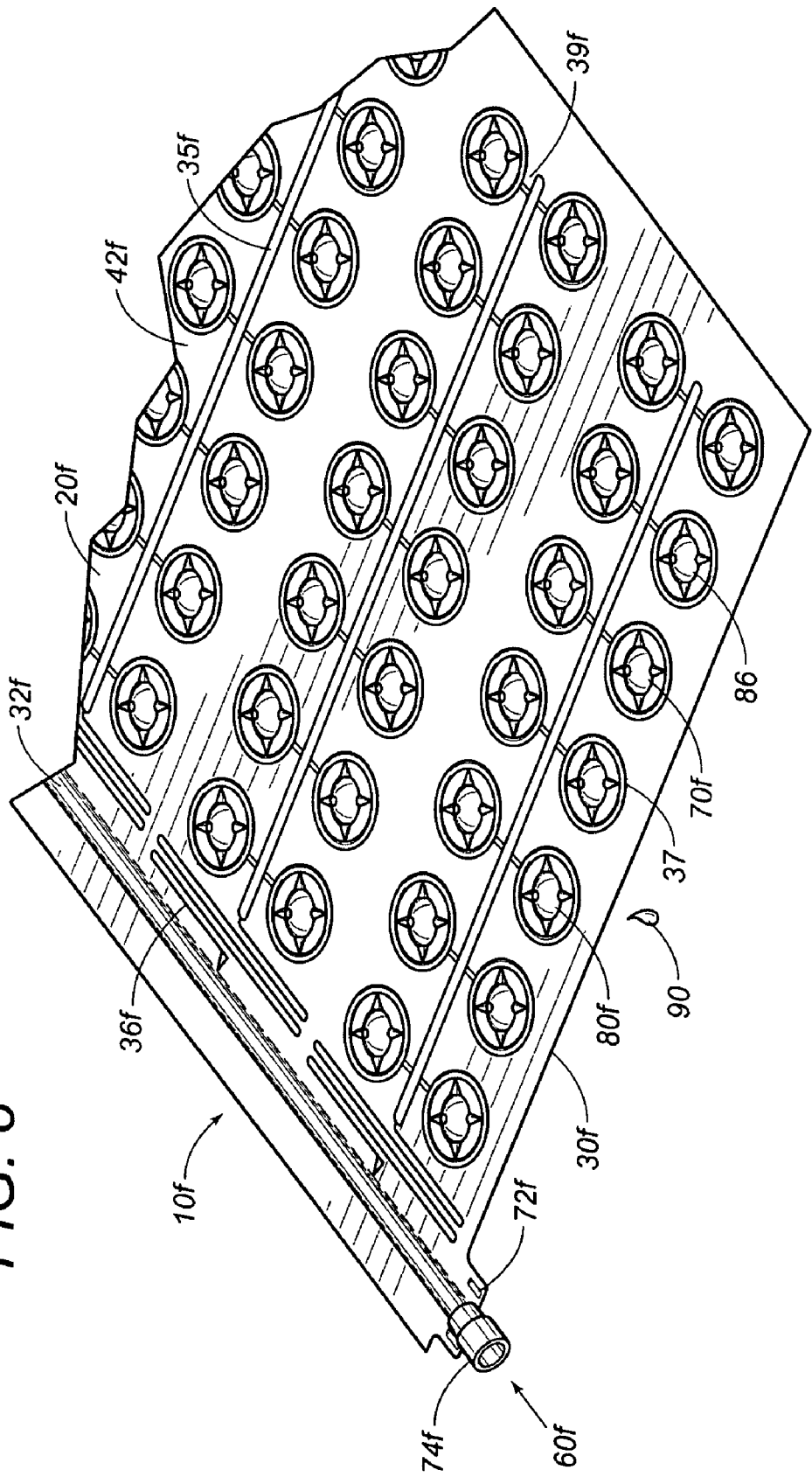
FIG. 8 is an upper perspective, isometric view of a third embodiment of the current invention designed for general use.

FIG. 8 depicts still another preferred embodiment of the current invention, generally indicated at 10*f*, designed for random placement of crops, such as in a kitchen garden or landscaping application. It will be noted that the bottom layer 30*f* and the top layer 20*f* of the laminated assembly 42*f* are the same width and wide enough to act as an plastic mulch. An envisioned kitchen garden application has this width at approximately 36 inches.

The polymeric material layers 20*f* & 30*f* would be made of colored and opaque low density polyethylene to retain heat in the growing bed, eliminate weeds, and provide a desired appearance. Both layers 20*f* & 30*f* would be approximately 0.006 inches thick to create a durable, inexpensive laminated assembly 42*f*.

The distribution header 32*f* of this embodiment is located on one edge of the laminated assembly 42*f* and terminated 72*f* with a standard fitting 74*f* thus allowing for attachment of the inlet 60*f* to a irrigation fluid source (not shown). The first flow restricting means 36*f* are connected to the distribution header 32*f* and are designed to be very long so as to achieve significant flow reduction. The first flow restricting means 36*f* feed secondary distribution headers 35*f* oriented across the width of the mat 10*f*. Each of the secondary distribution headers 35*f* supplies a multiplicity of planting sites 80*f* through secondary flow restricting means 39*f*. Similar to the embodiment shown in FIG. 2, the planting sites 80*f* are surrounded by a tertiary circular distribution header 37 with multiple outlet ports 70*f* to minimize plugging.

Circular perforations 86 are made in the laminated assembly 42*f* in the center of each circular distribution header 37. These perforations 86 are only partially cut through so that upon initial installation the material is retained is the plane of the laminated assembly 42*f*. The partial perforations do not intersect the outlet ports 70*f* so they remain normally closed. In this manner a grid of potential planting sites 80*f* is created.

Planting is accomplished by first determining which planting site 80*f* is desired. The center of the circular perforation 86 is cut or torn out, thus opening the desired outlet port 70*f*. Finally, the transplant or seed (not shown) is planted through the resulting planting site hole. The described network of fluid-conveying passageways 50*g* are configured to provide irrigation fluid 90 from the inlet 60*f* to all outlet ports 70*f* that are open at consistent and very low drip rates. The unitized mat 10*f* also provides the benefits of weed control, surface evaporation, and soil temperature control.

Referring to the embodiments depicted in FIGS. 2, 6, 7, and 8, terminating the end of the distribution header(s) 32*b,d,e*, and *f* opposite the inlet 60 can be accomplished on site by simply folding the laminated assembly 42*b,d,e*, and *f* and securing the fold with adhesive tape, elastic band, or spring powered clip (not shown).

Figure 9:
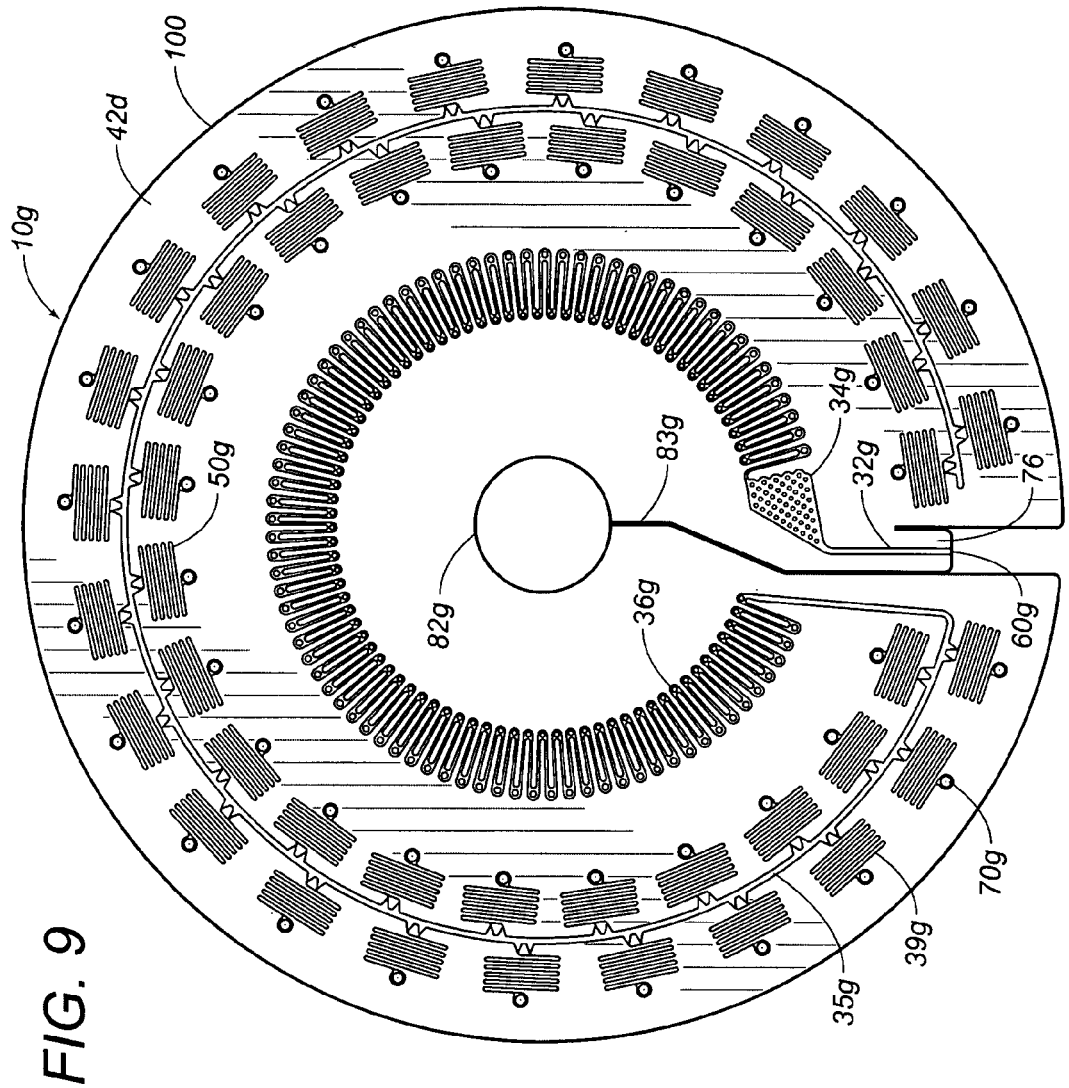
FIG. 9 is a top plan view of a fourth embodiment of the current invention designed for horticultural use.

FIG. 9 depicts a top plan view of another preferred embodiment of the current invention, generally indicated at 10*g*, designed to irrigate large woody plants with a central trunk or stem and spaced at inconsistent distances, such as found in home and industrial landscaping. The laminated assembly 42*g* is made circular with a diameter 100 large enough to act as a plastic mulch ring around the base of the plant to control weeds, minimize soil erosion and surface irrigation fluid evaporation. A center circular hole 82*g* and perforated slit 83*g* is provided for installing the mat 10*g* around the central trunk of existing plants.

An integral tube section 76 is used to connect the inlet 60*g* to a irrigation fluid source (not shown). The unitized mat 10*g* provides for the distribution of irrigation fluid from the inlet 60*g*, thru the fluid-conveying passageways 50*g* to optimally spaced outlet ports 70*g* within the area covered by the laminated assembly 42*g* at a low and uniform rate. The fluid-conveying passageways 50*g* comprises a distribution header 32*g* connected to the inlet 60*g*, a debris trap 34*g* for trapping sediment and/or filtering, a primary flow restricting means 36*g* for reducing the fluid pressure, a secondary distribution header 35*g*, and multiple secondary flow restricting means 39*g* to further reduce the fluid pressure to each of the outlet ports 70*g*.

The outlet ports 70*g* comprise holes in the bottom polymeric material layer (not shown) near the outer edge of the covered surface so as to encourage roots to spread out from the root ball.

The unitized mat 10*g* may be any color to offer the desired appearance or providing the plants optimum growing conditions. A plurality of perforations may be added through the laminated assembly 42*g* in areas that do not interfere with the function of the fluid-conveying passageways 50*g* to provide aeration. The unitized mat 10*g* may be covered with organic mulch or, alternatively, ground recycled polymeric material may be bonded to the polymeric layer 20*g* or 30*g* to simulate organic mulch.

Figure 10:
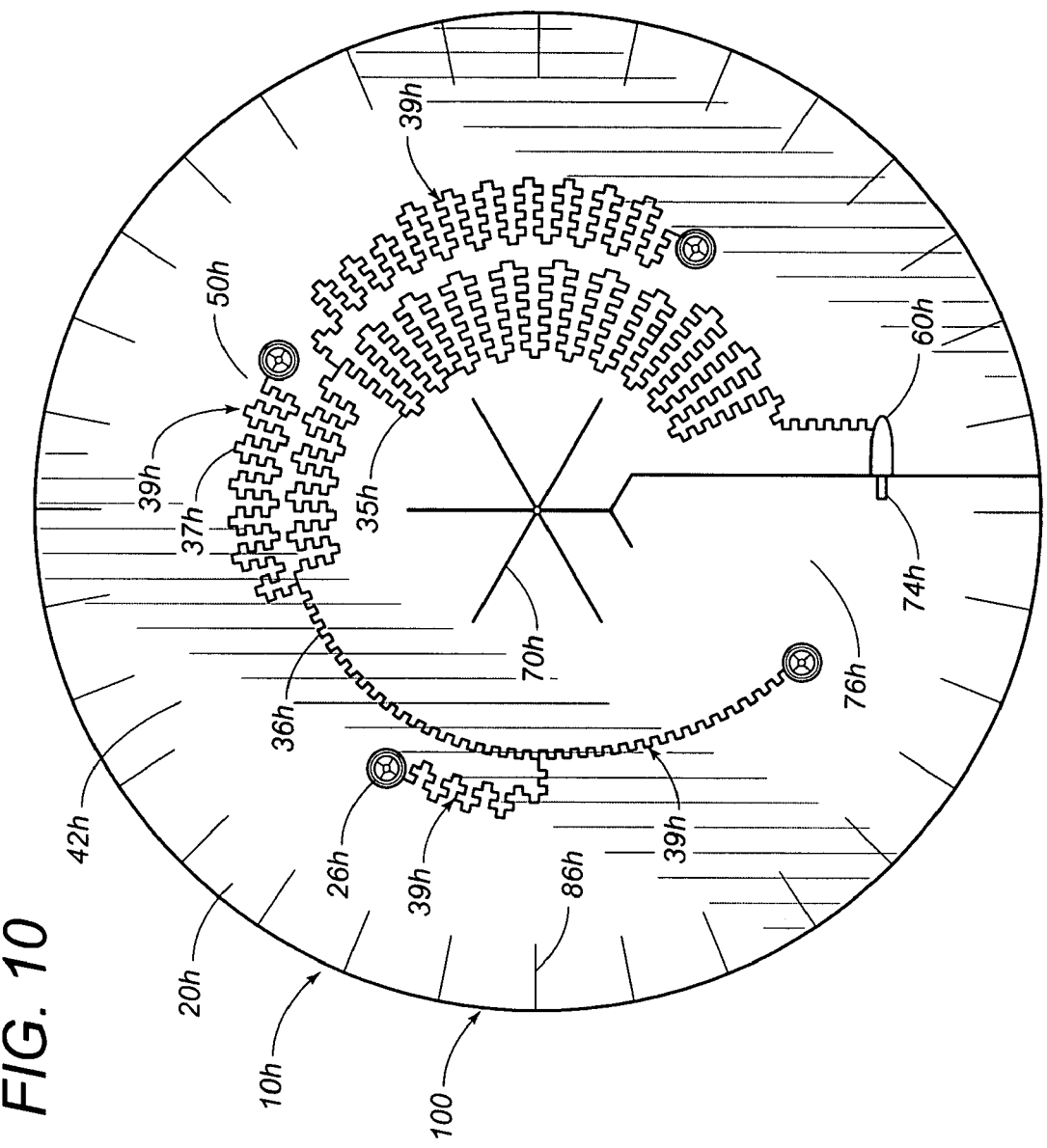
FIG. 10 is another top plan view of a fifth embodiment of the current invention designed for greenhouse container use.

FIG. 10 depicts a plan view of another preferred embodiment of the current invention, generally indicated at 10*h*, designed to irrigate woody plants grown in containers in greenhouses, landscape nurseries, and home applications. An inlet 60*h* is terminated with an fitting 74*h* for connection to a irrigation fluid source (not shown).

The fluid-conveying passageways 50*h* comprise multiple sections of flow restricting means 36*h* having various lengths to both distribute the fluid and reduce the fluid pressure, multiple secondary flow restricting means 39*h* to further reduce the fluid pressure to each of the outlet ports 70*h*. In this particular embodiment, the flow restricting means 36*h* & 39*h* are composed of tortuous paths as practiced by the prior art and also designed to equally space the outlet ports 70*h* around the circular unitized mat 10*h*. This tortuous path configuration allows for proper operation when used with smaller container sizes.

A serrated opening 83*h* is provided for the plant to grow through. An overlapping seam 76*h* is provided to allow installation around the trunk of the plant without exposure of any soil. The outer edge 100 is sized to closely fit the container and may optionally have flexible extensions 86*h* to allow for variations in the container size.

The laminated assembly 42*h* provides a complete cover for the growing media thus decreasing weed germination and surface irrigation fluid evaporation. The laminated assembly 42*h* can be constructed from any polymeric material and in any color. For example, using black polymeric film on the top layer 20*h* will result in some additional retained solar heat in the growing medium while white will tend to reflect heat and light. In this manner, inverting the mat 10*h* could present a different color on the upper surface and thus improve growing conditions throughout the seasons.

Each polymeric material layer would be approximately 0.004 inches thick while the outer edge 100 would have a diameter between approximately 6 and 25 inches, and enlarged or reduced according to the size of the container.

The present invention also includes a method of enhancing the growth of plants comprising: selectively bonding multiple polymeric material layers so as to define a least one fluid passageway, having an inlet to accept fluid from a source and at least one outlet; sizing and shaping the layers to cover an irrigation area around a plant so as to act as a mulch; positioning a multi-dimensional array of outlets at optimum spacing within the area covered by the polymeric material layers; supplying a fluid to the fluid passageway such that the fluid exits the outlets at a metered discharge rate; and irrigating the plant with the fluid from the outlets.

The fluid source may be combined with means to supply nutrients and chemicals such as fertilizers and systemic insecticides to the irrigation fluid. It is envisioned that some suitable filtration will be required to remove larger particulates, biological materials, and dissolved chemicals that would produce plugging.

The unitized mat may be altered to hold seeds in proximity to the outlets so as to improve the efficiency of planting.

Additional layers of polymeric material may be formed and bonded to provide insulating properties to the laminated assembly. Pockets or layers of air can be formed within the area of the unitized mat to provide significant insulation to extend the growing season. These pockets or layers of air may be filled during production or in the field, as needed.

The present invention achieves significant advantages over prior irrigation and mulching devices. First, the present invention delivers very small amounts of irrigation fluid at specific plant sites without being prone to plugging by using flow restricting means of greater length and larger cross sections than current devices. A further advantage of the present invention is that the irrigation can be "customized" for different plants and growing environments by varying the delivery flow rates and the number and location of outlets at each growing site. The outlets can be made larger and more numerous due to the additional area contained within the unitized mat.

Secondly, the present invention achieves the benefits of plastic mulch, such as reduced water evaporation, less weeds, control of soil and irrigation fluid temperatures leading to earlier and higher yields or extended growing seasons, erosion control, and a desirable appearance.

The present invention combines the many benefits of an efficient fluid distribution device with the many benefits of plastic mulch in an inexpensive, durable, and easy to install unitized mat which can be easily removed when no longer needed.

Those trained in the art will recognize that the various features shown as part of any of the abovementioned embodiments can be incorporated into other embodiments, including embodiments not depicted and described herein.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

We claim:

1. A unitized mat to facilitate growing plants, comprising:
    at least two polymeric material layers being suitably sized and shaped to cover a an area immediately around at least one plant and selectively bonded together to define fluid-conveying passageways forming at least one distribution headers and a at least one flow restricting means, the polymeric material layers having at least one perforation extending therethrough, said at least one perforation being an opening receiving at least one plant therethrough;
    an inlet means for delivery of a fluid into a first of the at least one distribution header through the polymeric material layers, said inlet means being in fluid communication with the first distribution header, said flow restricting means extending outwardly from said first distribution header; and
    an outlet means for dispensing fluid into a root zone area covered by at least one layer of said polymeric material layers and positioned at the perforation, said outlet means being in fluid communication with a second of the at least one distribution header said flow restricting means throughout the polymeric material layers being in fluid communication between said first distribution header and said second distribution header, said flow restricting means extending outwardly from said first distribution header to said second distribution header; said outlet means having multiple outlet ports being positioned at said perforation.

2. The unitized mat of claim 1, wherein said fluid conveying passageways are comprised of formed recesses within one or more surfaces of the polymeric material layers, said formed recesses having a cross-section sufficiently large to allow passage of suspended water-born particles.

3. The unitized mat of claim 1, wherein at least one distribution header has an integral passive filter at an end thereof.

4. The unitized mat of claim 3, wherein said integral filter comprises a plurality of sediment traps.

5. The unitized mat of claim 1, wherein said polymeric material layers form a generally impervious barrier to gas, fluid, light, and undesired plants.

6. The unitized mat of claim 1, wherein the polymeric material layers have a planar surface in a circular shape, elliptical shape, or a polygonal shape.

7. The unitized mat of claim 1, wherein the polymeric material layers have an exterior color.

8. The unitized mat of claim 7, wherein the polymeric material layers have different colors.

9. The unitized mat of claim 8, wherein the polymeric material layers are invertable.

10. The unitized mat of claim 1, wherein the polymeric material layers have one or more reflective surfaces.

11. The unitized mat of claim 1, wherein the polymeric material layers have one or more absorptive surfaces.

12. The unitized mat of claim 1, further comprising:
an additional polymeric material layer selectively bonded to the polymeric material layers and forming at least one region of air between the additional polymeric material layer and said two polymeric material layers.

13. The unitized mat of claim 1, wherein the polymeric material layers are comprised of:
a material selected from a group consisting of thermoplastics, polyethylene, polypropylene, polyester, nylon, thermoplastic elastomers and thermosets; and
a chemical stabilizer.

14. The unitized mat of claim 1, wherein at least one of the polymeric material layers is of bicomponent construction with a single surface having a lower-melt-temperature layer.

15. The unitized mat of claim 1, wherein said outlet means and the perforations are selectively openable.

16. The unitized mat of claim 1, further comprising:
a mulch layer placed on a top surface of the polymeric material layers.

17. The unitized mat of claim 16, wherein said mulch layer is affixed to one of the polymeric material layers.

18. The unitized mat of claim 16, wherein said mulch layer is artificial.

19. The unitized mat of claim 16, wherein a portion of said mulch layer comprises scrap or recycled polymeric material.

20. The unitized mat of claim 1, wherein the polymeric material layers have aeration perforations formed therethrough and not within said fluid conveying passageways.

21. The unitized mat of claim 1, further comprising:
one or more seeds placed approximately adjacent to said outlet means.

22. The unitized mat of claim 1, wherein said flow restricting means has a flow length equal to or greater than one foot.

23. The unitized mat of claim 22, wherein, when said fluid is supplied to said inlet means with an inlet pressure of 10 pounds per square inch, fluid flows through each outlet means at approximately 0.10 gallons per hour or less, and wherein said flow restricting means has a cross section sufficiently large to allow passage of suspended water-born particles.

24. The unitized mat of claim 22, wherein, when said fluid is supplied to said inlet means with an inlet pressure of 10 pounds per square inch, said fluid flows through each outlet means at approximately 0.010 gallons per hour or less, and wherein flow restricting means has a cross section sufficiently large to allow passage of suspended water-born particles.

25. A method of enhancing the growth of plants, comprising:
forming a unitized mat having at least one polymeric material layer, said polymeric material layer having a selected color, reflective properties, barrier properties, and shape to act as define fluid-conveying passageways forming at least one distribution header and at least one flow restricting means, the polymeric material layers having at least one perforation extending therethrough, said at least one perforation being an opening receiving at least one plant therethrough;
disbursing water through a fluid passageway in said unitized mat through irrigation watering outlets at one or more selected rates and locations within said unitized mat, said fluid passageway forming at least one distribution header and at least one flow restricting means, a first of the at least one distribution header being in fluid communication with an inlet, the flow restricting means extending outwardly from said first distribution header, a second of the at least one distribution header through said unitized mat being in fluid communication with said flow restricting means, said flow restricting means extending outwardly from said first distribution header to said second distribution header; and an outlet means for dispensing fluid into a root zone area covered by at least one layer of polymeric material layer, said outlet means being in fluid communication with said second distribution header, said outlet means having multiple outlet ports being positioned at said at least one perforation.

26. The method of claim 25, further comprising:
forming perforations within said mat with an opening large enough for a plant and spaced at optimum distances to enhance plant growth.

27. A method to facilitate growing of plants, comprising:
forming a unitized mat of at least two polymeric material layers sized and shaped to cover an area immediately around at least one of the plants, the polymeric material layers being selectively bonded together to define fluid-conveying passageways forming at least one distribution header and at least one flow restrictor, the polymeric material layers having at least one perforation extending therethrough, said at least one oerforation being an opening receicing at least one plant therethrough, a first of the at least one distribution header being in fluid communication with an inlet, the flow restrictor extending outwardly from said first distribution header, a second of the at least one distribution header through said unitized mat being in fluid communication with said flow restrictor, said flow restrictor extending outwardly from said first distribution header to said second distribution header;
delivering a fluid through an inlet into the first and second distribution headers throughout the polymeric material layers;
disbursing and metering said fluid from the first and second distribution headers through the flow restrictors to a plurality of outlets at an end of the fluid-conveying passageways covered by the polymeric material layers; and
dispensing said fluid through one or more outlets at an end of the fluid-conveying passageways positioned at said at least one perforation and covered by at least one layer of the polymeric material layers.

28. A unitized mat to facilitate growing plants comprising:
an artificial mulch formed by at least two sized and shaped polymeric material layers to cover an area immediately around at least one of the plants, the material layers being selectively bonded together to define fluid-conveying passageways forming at least one distribution headers and at least one flow restricting means, the polymeric material layers having at least one perforation extending therethrough, said at least one perforation being an opening receiving at least one plant therethrough;

an inlet means for delivery of a fluid into a first of the at least one distribution header through the polymeric material layers, said inlet means being in fluid communication with the first distribution header, said flow restricting means extending outwardly from said first distribution header; and an outlet means for dispensing fluid into a root zone area covered by at least one layer of said polymeric material layers and positioned at the perforation, said outlet means being in fluid communication with a second of the at least one distribution header, said flow restricting means throughout the polymeric material layers being in fluid communication between said first distribution header and said second distribution header, said flow restricting means extending outwardly from said first distribution header to said second distribution header, said outlet means having multiple outlet ports being positioned at said at least one perforation;

wherein said flow restricting means for metering fluid is in fluid connection with the first and second distribution headers and said outlet means.

\* \* \* \* \*